O. F. DUBRUIEL.
COMBINED WIRE PULLER AND FISH TAPE GUIDE.
APPLICATION FILED AUG. 8, 1911.

1,049,825.

Patented Jan. 7, 1913.

WITNESSES
G. M. Spring
F. D. Owen

INVENTOR
Omer F. Dubruiel,
by
his Attorney

UNITED STATES PATENT OFFICE.

OMER F. DUBRUIEL, OF DULUTH, MINNESOTA.

COMBINED WIRE-PULLER AND FISH-TAPE GUIDE.

1,049,825.  Specification of Letters Patent.  Patented Jan. 7, 1913.

Application filed August 8, 1911. Serial No. 642,904.

*To all whom it may concern:*

Be it known that I, OMER F. DUBRUIEL, a citizen of the United States, residing at Duluth, in the county of St. Louis and State of Minnesota, have invented new and useful Improvements in Combined Wire-Pullers and Fish-Tape Guides, of which the following is a specification.

My invention relates to fish tape guides and wire pullers.

An object of my invention is to provide a device that will guide a fish tape through a conduit and prevent it from fouling.

Another object of my invention is to provide a fish tape guide that may also be used to guide wires when pulled through a conduit.

With the foregoing and other objects in view, my invention consists in such details of construction and in the arrangement and combination of parts as will be hereinafter more fully described and specifically pointed out.

Figure 1:
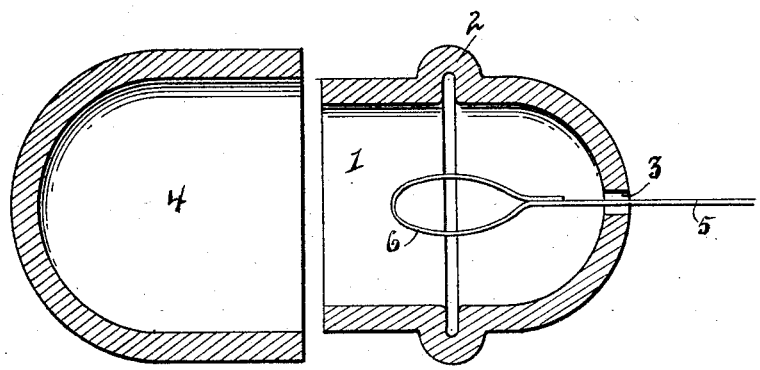
Figure 2:
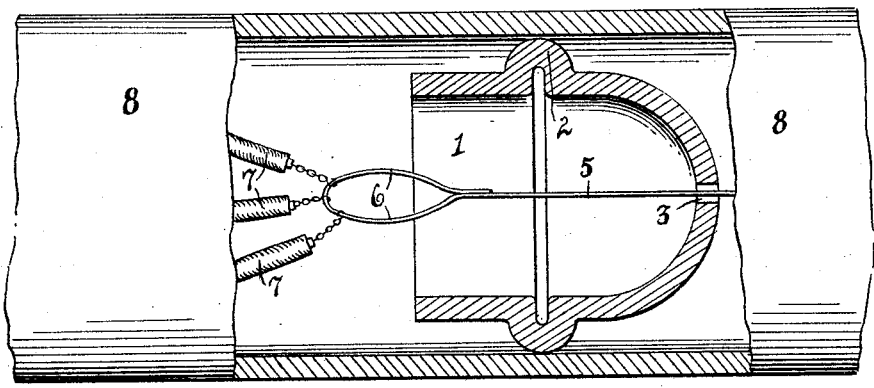
Figure 3:
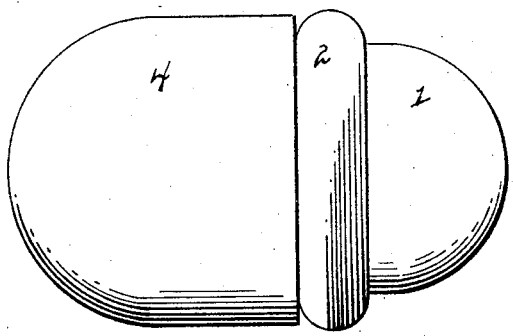

In describing my invention in detail reference will be had to the accompanying drawings wherein like characters denote like or corresponding parts throughout the several views and in which, Figure 1 is a vertical cross section of my invention. Fig. 2 is a cross section of a part of my invention, showing it as a wire puller in a conduit. Fig. 3 is an elevation of my invention.

In carrying my invention into practice I use a short tube 1 with one of its ends closed in the shape of a half sphere. About midway between the extremities of the tube 1 is an annular shoulder 2 and at the center of the closed end is a hole 3. I also use another short tube 4 which is closed at one of its ends in the same manner as is the tube 1. The tube 4 is of larger diameter than the tube 1 and is adapted to fit snugly or frictionally over the straight portion of the tube 1. The shoulder 2 is to prevent the tube 4 from slipping on the portion 1 too far and also to guide the parts when they are pushed or pulled through the conduit.

In operation my invention works as follows:—The fish tape 5 is first passed through the hole 3 and bent into a loop 6. The portion 4 is then slipped over the portion 1 and the device is then placed in the conduit 8. By pushing on the fish tape 5 the loop 6 is brought against the end of the portion 4 and continued pressure on the fish tape causes the device to be pushed through the conduit 8. When it arrives at the end of the conduit the portion 4 is removed and the wires or cables 7 are fastened to the loop 6 and they are drawn back through the conduit. The portion 1 acts here also as a guide keeping the wires from fouling in any obstruction.

This device is very simple in operation, very cheap and is a great labor saver, as it saves much time both in putting the fish tape through the conduit and in drawing the wires back through the same.

I desire it to be understood that I may make slight changes in the construction and in the arrangement and combination of parts without departing from the spirit of my invention.

Having thus fully described my invention what I claim as new and desire to secure by Letters Patent, is:—

1. In a device of the character described, a first hollow member provided with a closed end and a fish tape receiving opening, and a second hollow member detachably engaging said first hollow member.

2. In a device of the character described, a first hollow member provided with a closed end and a fish tape receiving opening, and a second hollow member frictionally and detachably engaging said first hollow member.

3. In a device of the character described a hollow member having one end closed, and provided with an aperture in said closed end adapted to receive a fish tape, and an annular shoulder extending from said member whereby said member is guided in its movements.

4. In a device of the character described, a hollow section having one end thereof closed and provided with an aperture within said closed end, a second hollow section having one end closed and adapted to engage the first section, and means to limit the extent of engagement of said sections and to guide said sections in their movement.

5. In a device of the character described a hollow section, having one end thereof closed and provided with an aperture in said closed end, a second hollow section having one end closed and adapted to engage said first mentioned section and an annular shoulder on said first mentioned section to limit the engagement of the sections and guide said sections in their movement.

OMER F. DUBRUIEL.

Witnesses:
NAZAIRE DUBRUIEL,
JOHN BENSON.

Copies of this patent may be obtained for five cents each, by addressing the "Commissioner of Patents, Washington, D. C."